US009077814B2

(12) United States Patent
Lee

(10) Patent No.: US 9,077,814 B2
(45) Date of Patent: Jul. 7, 2015

(54) APPARATUS AND METHOD FOR ADJUSTING VOLUME IN A PORTABLE TERMINAL

(71) Applicant: Samsung Electronics Co., Ltd, Gyeonggi-do (KR)

(72) Inventor: Sang-Cheol Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 91 days.

(21) Appl. No.: 13/682,646

(22) Filed: Nov. 20, 2012

(65) Prior Publication Data

US 2013/0165178 A1 Jun. 27, 2013

(30) Foreign Application Priority Data

Dec. 22, 2011 (KR) .................. 10-2011-0140153

(51) Int. Cl.
| | | |
|---|---|---|
| H04B 1/06 | (2006.01) | |
| H04M 1/725 | (2006.01) | |
| H04M 1/00 | (2006.01) | |
| H04M 19/04 | (2006.01) | |
| H04M 1/60 | (2006.01) | |

(52) U.S. Cl.
CPC ............ *H04M 1/72569* (2013.01); *H04M 1/00* (2013.01); *H04M 1/6016* (2013.01); *H04M 19/044* (2013.01); *H04M 2250/10* (2013.01); *H04M 2250/12* (2013.01)

(58) Field of Classification Search
CPC ........................... H04M 19/044; H04M 1/605

USPC ........ 455/219, 355, 67.13, 177.1, 67.11, 570, 455/222
See application file for complete search history.

(56) References Cited

U.S. PATENT DOCUMENTS

| | | | | |
|---|---|---|---|---|
| 4,641,344 | A * | 2/1987 | Kasai et al. .................. 381/57 |
| 5,732,390 | A | 3/1998 | Katayanagi et al. | |
| 6,049,700 | A * | 4/2000 | Hardouin ...................... 455/69 |
| 6,298,247 | B1 * | 10/2001 | Alperovich et al. .......... 455/558 |
| 6,744,882 | B1 * | 6/2004 | Gupta et al. ............. 379/387.01 |
| 7,392,066 | B2 * | 6/2008 | Haparnas .................... 455/567 |
| 7,869,768 | B1 * | 1/2011 | Vishlitzky ................. 455/67.13 |
| 7,876,209 | B2 * | 1/2011 | Kracker et al. .............. 340/475 |
| 2005/0108642 | A1 | 5/2005 | Sinclair, II | |
| 2010/0016014 | A1 | 1/2010 | White | |

(Continued)

FOREIGN PATENT DOCUMENTS

| | | |
|---|---|---|
| CN | 101207879 A | 6/2008 |
| EP | 0 611 070 A2 | 8/1994 |

(Continued)

OTHER PUBLICATIONS

Extended European Search Report dated Apr. 2, 2013 in connection with European Patent Application No. 12192865.9, 6 pages.

(Continued)

*Primary Examiner* — Sonny Trinh

(57) ABSTRACT

An apparatus and method for adjusting the volume in a portable terminal. The apparatus includes an information collection unit and a volume adjustment unit. The information collection unit collects noise judgment information that is used for judging the extent of background noise. The volume adjustment unit estimates background noise using the collected information, and adjusts the volume according to the background noise.

13 Claims, 9 Drawing Sheets

(56) References Cited

U.S. PATENT DOCUMENTS

2011/0065484 A1    3/2011   Liu
2013/0078976 A1*   3/2013   Naftolin ................. 455/418

FOREIGN PATENT DOCUMENTS

| JP | 2003-204577 | 7/2003 |
|----|-------------|--------|
| JP | 2003-284138 | 10/2003 |
| JP | 2005-253097 | 9/2005 |
| JP | 2006-238090 | 9/2006 |
| JP | 2008-306242 | 12/2008 |
| KR | 10-2010-0007568 | 1/2010 |
| KR | 10-2010-0035042 | 4/2010 |
| KR | 10-2011-0046088 | 5/2011 |

OTHER PUBLICATIONS

Notice of Preliminary Rejection dated Oct. 22, 2013 in connection with Japanese Patent Application No. 2012-236944, 7 pages.
Notice of Preliminary Rejection dated Jul. 15, 2014 in connection with Japanese Patent Application No. 2012-236944, 8 pages.
Detailed First Office Action dated Dec. 1, 2014 in connection with Chinese Application No. 2012-10551880.2; 12 pages.

* cited by examiner

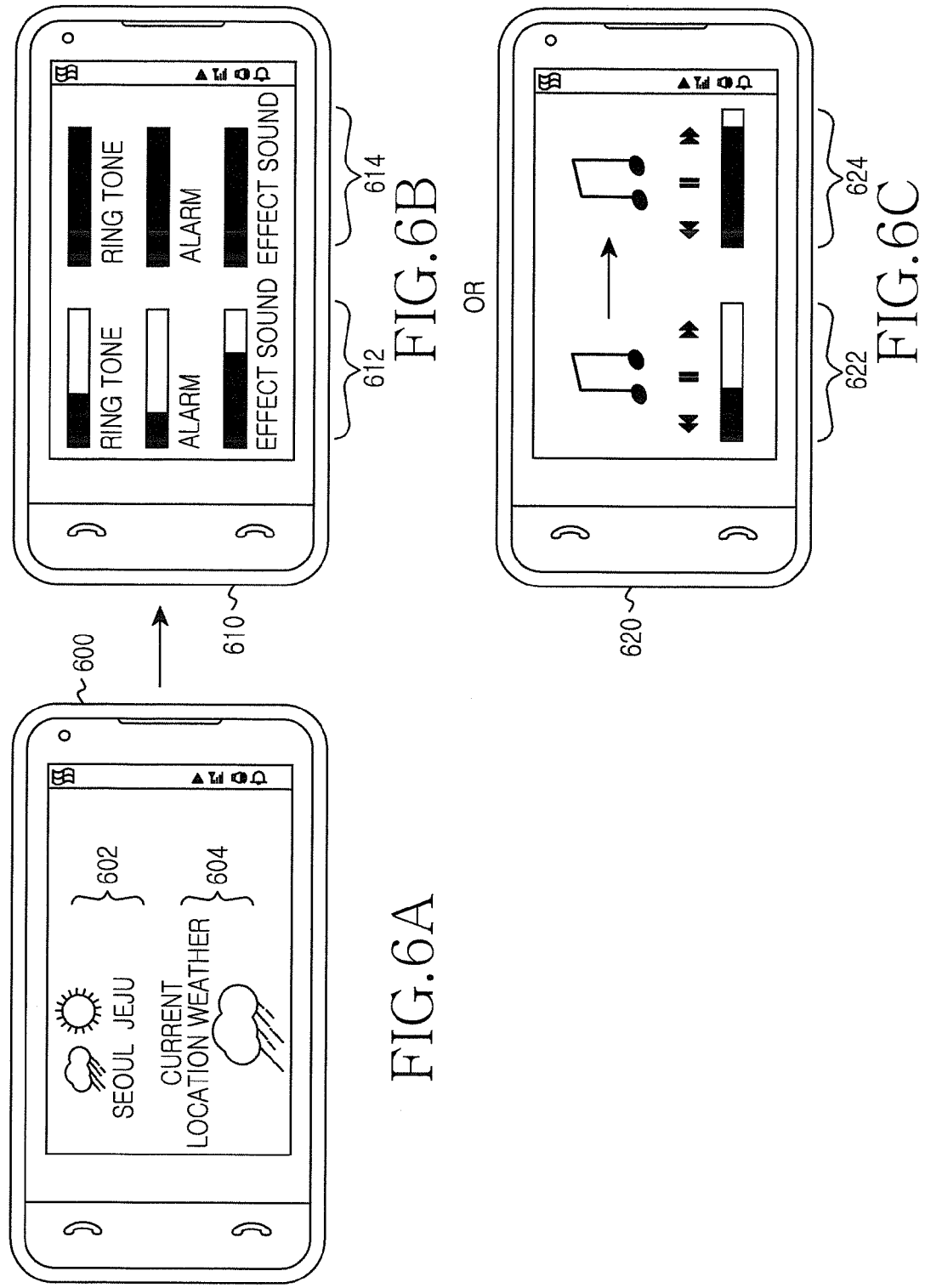

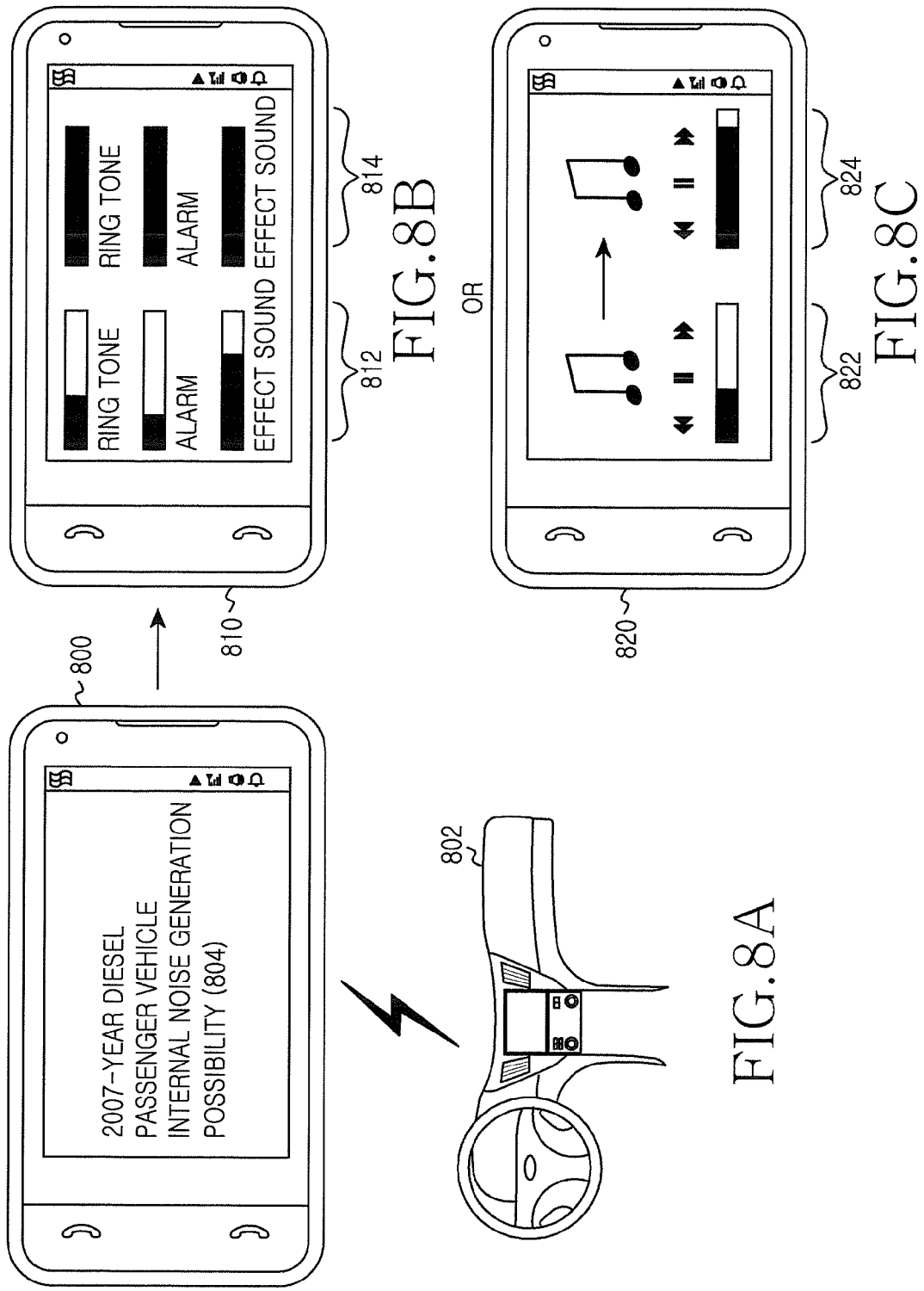

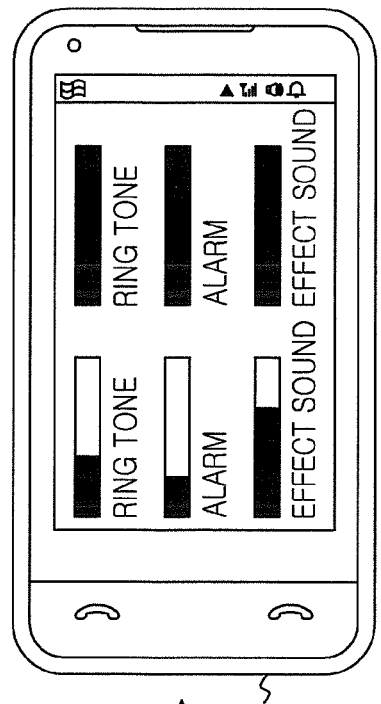
FIG.9B
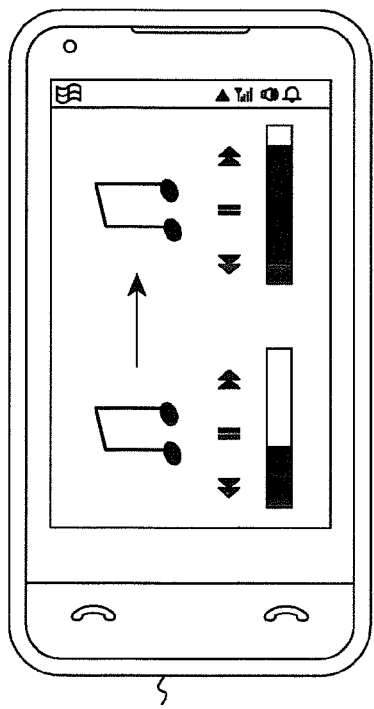
FIG.9C
FIG.9A
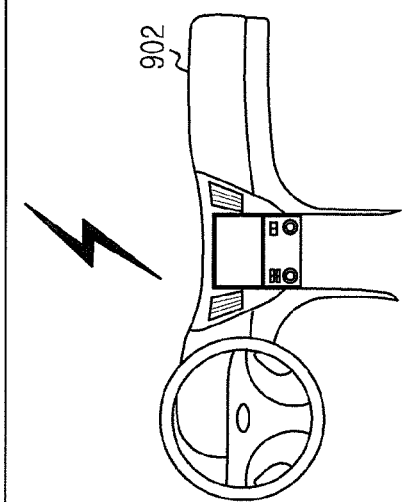

APPARATUS AND METHOD FOR ADJUSTING VOLUME IN A PORTABLE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Dec. 22, 2011 and assigned Serial No. 10-2011-0140153, the contents of which are herein incorporated by reference.

TECHNICAL FIELD OF THE INVENTION

The present invention relates to audio devices, and more particularly, to an apparatus and method for adjusting volume in a portable terminal.

BACKGROUND OF THE INVENTION

Portable terminals providing wireless voice call service and information exchange capabilities have become an important aspect of present day lifestyle. Early portable terminals merely provided simple voice services. However, present day technology has provided portable terminals with increased utility, considering the increased terminal functions such as playing a game, remote control using local area network communication, and image capturing by equipped digital camera, as well as simple telephony or schedule management, and meets a user's desire.

Manufacturers have recently provided portable terminals with increased supplementary functions. Further, the manufacturers should improve a call quality and provide the improved call quality to users, for the sake of the original function, i.e., a wireless call function.

This is because, when a user makes a call using a portable terminal in various environments, there can be a difference in a call quality actually experienced by the user according to environments. For example, when a user makes a call in heavy background noise environment, he/she can experience a poor call quality due to an unclear voice signal.

Accordingly, the user can increase the call volume of the portable terminal to improve the poor call quality. At this time, the user can manipulate a volume button of the portable terminal to increase the call volume, but this causes an inconvenience in terminal use.

Further, when the user adjusts the volume while driving a vehicle, there is a problem that the danger of traffic accident is induced.

Accordingly, to solve the above problem, an apparatus and method for automatically adjusting the volume depending on the circumstances in a portable terminal are needed.

SUMMARY OF THE INVENTION

To address the above-discussed deficiencies of the prior art, it is a primary object to provide at least the advantages below. Accordingly, one aspect of the present invention is to provide an apparatus and method for adjusting the volume according to background noise in a portable terminal.

Another aspect of the present invention is to provide an apparatus and method for adjusting the volume according to a vehicle state and model in a portable terminal.

A further aspect of the present invention is to provide an apparatus and method for automatically adjusting the volume according to weather information in a portable terminal.

Yet another aspect of the present invention is to provide an apparatus and method for automatically adjusting the volume according to a movement speed in a portable terminal.

The above aspects are achieved by providing an apparatus and method for adjusting the volume in a portable terminal.

According to one aspect of the present invention, an apparatus for adjusting the volume in a portable terminal is provided. The apparatus includes an information collection unit and a volume adjustment unit. The information collection unit collects noise judgment information that is used for judging the extent of background noise. The volume adjustment unit estimates background noise using the collected information, and adjusts the volume according to the background noise.

According to another aspect of the present invention, a method for adjusting the volume in a portable terminal is provided. The method includes collecting noise judgment information that is used for judging the extent of background noise, estimating background noise using the collected information, and adjusting the volume according to the background noise.

According to a further aspect of the present invention, an electronic device includes one or more processors for executing computer programs, a memory for storing data and instructions, and one or more modules stored in the memory and constructed to be executed by the one or more processors. The module collects noise judgment information that is used for judging the extent of background noise, estimates background noise using the collected information, and adjusts the volume according to the estimated background noise.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A through 6C illustrate an example process for adjusting a preset volume according to background noise in a portable terminal according to certain embodiments of the present invention;

FIGS. 8A through 8C illustrate an example process for adjusting a preset volume according to background noise in a portable terminal according to certain embodiments of the present invention; and FIGS. 9A through 9C illustrate an example process for adjusting a preset volume according to background noise in a portable terminal according to certain embodiments of the present invention.

DETAILED DESCRIPTION OF THE INVENTION

FIGS. 1 through 9C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminals. Preferred embodiments of the present invention will be described herein below with reference to the accompanying drawings. In the following description, well-known functions or constructions are not described in detail since they would obscure the invention in unnecessary detail.

The present invention relates to an apparatus and method for automatically adjusting the volume according to background noise.

An apparatus and method for detecting background noise using a vehicle state and model, weather information, and a movement speed, and automatically adjusting a volume according to the background noise in a portable terminal according certain embodiments of the present invention are described below. Further, in the following description, the portable terminal such as a portable electronic device can be a mobile phone, a media player, a tablet computer, a handheld computer, or a Personal Digital Assistant (PDA). Also, the portable terminal can be an arbitrary portable electronic device including a device having a combination of two or more functions among these devices.

Figure 1:
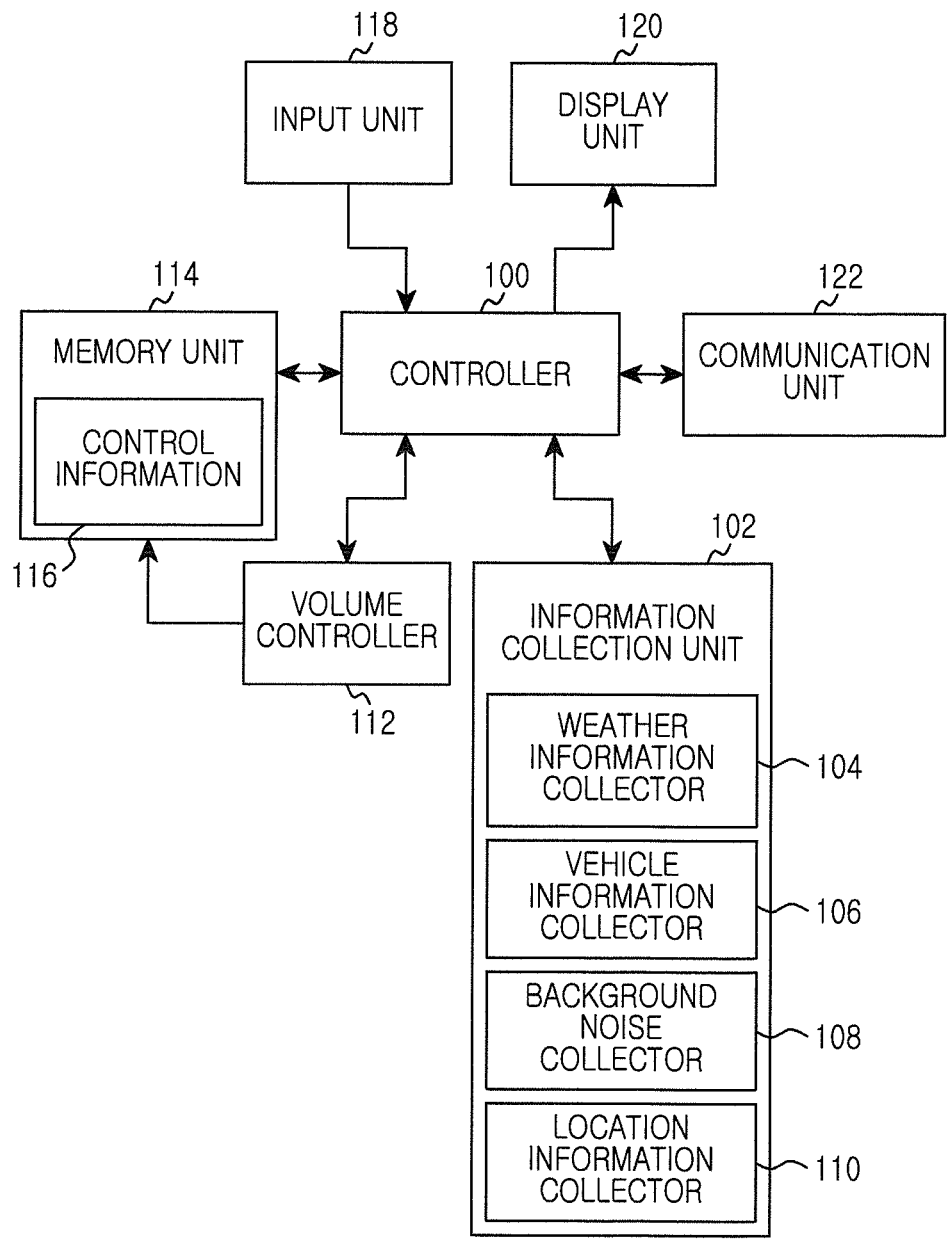
FIG. 1 illustrates an example portable terminal configured to automatically adjusting a volume according to background noise according certain embodiments of the present invention.

FIG. 1 illustrates an example portable terminal automatically adjusting volume according to background noise according to the present invention.

Referring to FIG. 1, the portable terminal includes a controller 100, an information collection unit 102, a volume adjustment unit 112, a memory unit 114, an input unit 118, a display unit 120, and a communication unit 122. Further, the information collection unit 102 includes a weather information collector 104, a vehicle information collector 106, a background noise collector 108, and a location information collector 110. The memory unit 114 stores control information 116.

The controller 100 of the portable terminal controls a general operation of the portable terminal. For example, the controller 100 performs processing and control for voice call and data communication. In addition to a general function, according to the present invention, the controller 100 estimates noise generated around the terminal and adjusts the volume according to the estimated result.

Further, when the background noise generated is eliminated, the controller 100 restores the adjusted volume to the original.

Under the control of the controller 100, the information collection unit 102 collects noise judgment information that is used for estimating the extent of background noise and provides the noise judgment information to the volume adjustment unit 112.

At this time, the information collection unit 102 collects information for use in background noise judgment, such as weather information, a vehicle state and model, a movement speed, and the like.

The weather information collector 104 acquires weather information on a current location via any suitable means, such as through a server providing weather information or an application providing weather information.

The vehicle information collector 106 communicates with a vehicle which a user of the terminal uses, and acquires vehicle information such as a vehicle fuel type, a vehicle year, a vehicle model, and the like.

Further, the vehicle information collector 106 communicates with a vehicle which a user of the terminal uses, and acquires information about one or more functions executed by the vehicle.

The background noise collector 108 activates a microphone and collects background noise that is generated.

The location information collector 110 acquires a movement speed of the terminal using any suitable means, such as by Global Positioning System (GPS) information.

Further, the location information collector 110 acquires a movement speed of the terminal using any suitable means, such as by information received through a Base Station (BS).

Under the control of the controller 100, the volume adjustment unit 112 estimates background noise, detects the volume corresponding to the estimated background noise, and adjusts the volume of an audio that is outputted from the portable terminal.

That is, when the volume adjustment unit 112 detects the generation of background noise by the controller 100, the volume adjustment unit 112 increases a level of a preset volume. When the background noise is eliminated, the volume adjustment unit 112 can restore the adjusted volume to the original volume. The volume adjustment unit 112 can estimate background noise using various ambient conditions, such as weather information, vehicle information, a movement speed, and the like.

At this time, the volume adjustment unit 112 compares the estimated background noise with the control information 116 stored in the memory 114 and adjusts the volume to the current noise and, when the generated background noise is eliminated, restores the adjusted volume to the original volume.

Further, the volume adjustment unit 112 adjusts the volume corresponding to background noise and then, when there is a volume adjustment is requested by a user, the portable terminal adjusts the volume according to the user's request. After that, the volume adjustment unit 112 reflects information corresponding to the volume adjusted according to the user's request in the control information 116 and, at the time of future volume adjustment of the same condition, adjusts a value according to the user's request.

Operations of the controller 100, the information collection unit 102, and the volume adjustment unit 112 can be executed by one or more software modules (i.e., a set of instructions) stored in the memory unit 114. The software module is executed by the controller 100.

That is, the operations of the controller 100, the information collection unit 102, and the volume adjustment unit 112 can be performed by software or hardware. Also, the information collection unit 102 and the volume adjustment unit 112 can be defined as controllers. Further, the controller 100 is defined as a processor, and the information collection unit 102 and the volume adjustment unit 112 can be defined as another processor.

The memory unit 114 includes a Read Only Memory (ROM), a Random Access Memory (RAM), and a flash ROM. The ROM stores a program for processing and controlling the controller 100, the information collection unit 102, and the volume adjustment unit 112, and a variety of reference data.

The RAM, a working memory of the controller 100, stores temporary data generated in execution of a variety of programs. The flash ROM stores a diversity of updateable depository data such as a phone book, an outgoing message, an incoming message and the like. Further, the memory unit 114 stores the control information 116, which includes information about the volume to be adjusted according to a background noise level according to certain embodiments of the present invention.

The memory unit 114 stores one or more software modules to perform operations of the controller 100, the information collection unit 102, and the volume adjustment unit 112 according to certain embodiments of the present invention.

The input unit 118 includes numeral key buttons '0' to '9', a menu button, a cancel button, an OK button, a talk button, an end button, an Internet button, navigation key (or direction key) buttons, and a plurality of function keys such as a character input key. The input unit 118 provides key input data corresponding to a key pressed by a user, to the controller 100.

The display unit 120 displays state information generated during operation of the portable terminal, characters, a large level of moving pictures and still pictures and the like. The display unit 120 displays only data corresponding to a frame granted itself among data included in a message in accordance with certain embodiments of the present invention. The display unit 120 can be a color Liquid Crystal Display (LCD), an Active-Matrix Organic Light-Emitting Diode (AMOLED), and the like. The display unit 120 includes a touch input device and, when being applied to a portable terminal of a touch input scheme, the display unit 120 can be used as an input device of the portable terminal.

In fact, it is within the spirit and scope of the presently claimed invention that the input unit 118 and display unit 120 could all be served by a single touch screen. That is, a touch sensitive display, called as a touch screen, may be used as the display unit 120. In this situation, touch input may be performed via the touch sensitive display.

The communication unit 122 transmits/receives and processing a wireless signal including data that is inputted/outputted through an antenna (not shown). For example, during transmission, the communication unit 122 processes original data through channel coding and spreading, converting the original data into a Radio Frequency (RF) signal, and transmits the RF signal. During reception, the communication unit 122 converts a received RF signal into a baseband signal, processes the baseband signal through de-spreading and channel decoding, and restores the signal to original data.

The roles of the information collection unit 102 and the volume adjustment unit 112 can be implemented by the controller 100 of the portable terminal. However, as shown above, these are separately constructed and shown as an example construction for description convenience, and are not intended to limit the scope and spirit of the present invention. It will be understood by those skilled in the art that various modifications of construction can be made within the scope of the present invention. For example, construction may be such that all of these are processed by the controller 100.

Figure 2:
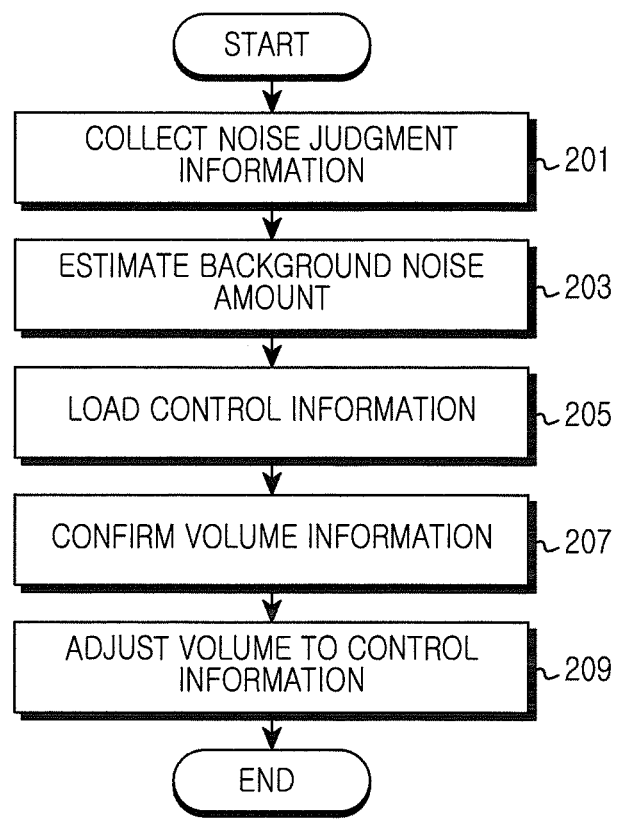
FIG. 2 illustrate an example process for adjusting a preset volume according to background noise in a portable terminal according to certain embodiments of the present invention.

FIG. 2 illustrates an example process for adjusting a preset volume according to background noise in a portable terminal according to certain embodiments of the present invention.

Referring to FIG. 2, in step 201, the portable terminal collects noise judgment information that includes information for judging the extent of background noise. Here, the background noise can include disturbing noise, a call sound, and the like outputted from the portable terminal, and the noise judgment information can be background noise input through a microphone, weather information acquired through a weather information server, a vehicle state, a vehicle model and the like. This is because noise can be generated from a vehicle moving at high speed, a rainy sound, etc. can disturb the audio signal.

At step 203, the portable terminal estimates a background noise level using the noise judgment information collected in step 201. Then at step 205, the portable loads control information. Here, the control information refers to information about the volume to be adjusted according to the background noise level. For example, the control information can allow the portable terminal to distinguish noise from among multiple levels and adjust the volume differently according to each level.

Further, the control information can allow the portable terminal to distinguish weather and adjust the volume differently every each weather. In addition, the control information can allow the portable terminal to distinguish each of a vehicle model, a movement speed, and the like into multiple levels and adjust the volume differently according to each level.

Next at step 207, the portable terminal confirms volume information to be adjusted according to noise generated around the portable terminal. Then at step 209, the portable terminal adjusts the volume to the control information.

That is, the portable terminal increases a preset volume according to background noise or, when the background noise is eliminated, restore the changed volume to the original volume.

Further, after the portable terminal adjusts the volume to the control information in step 209, the portable terminal checks if there is a volume adjustment request from a user.

This is because a situation can occur in which, when not meeting the volume adjusted by the control information, a user can adjusts the volume using a volume button or voice control.

If the volume adjustment is requested by the user, the portable terminal adjusts the volume according to the user's request. Further, the portable terminal reflects information corresponding to the volume adjusted according to the user's request in the control information and, at the time of future volume adjustment of the same condition, the portable terminal performs adjustment to a value reflecting the user's request.

After that, the portable terminal terminates an algorithm according to the present invention.

Figure 3:
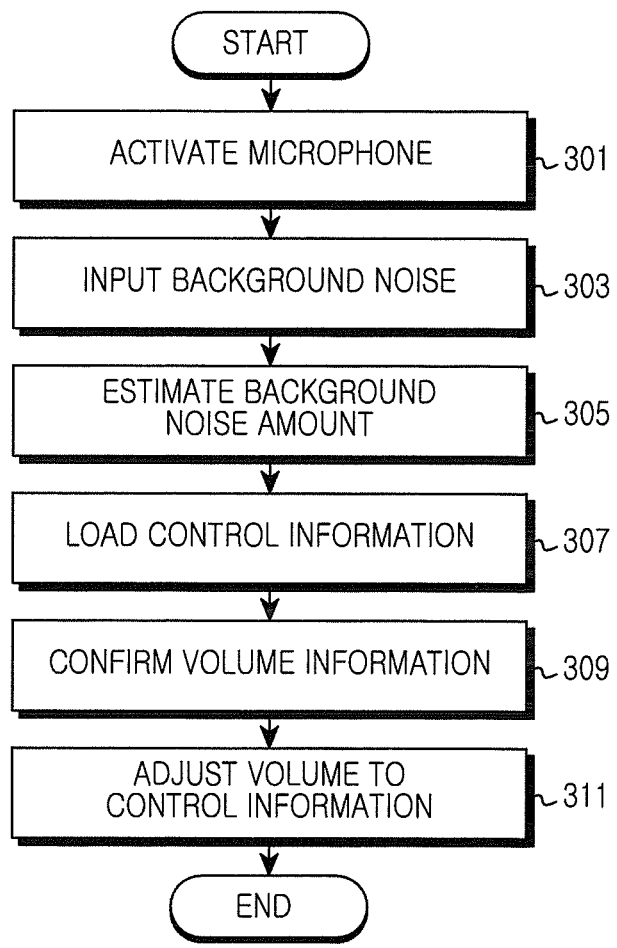
FIG. 3 illustrates an example process for adjusting a preset volume according to background noise in a portable terminal according to certain embodiments of the present invention.

FIG. 3 illustrates an example process for adjusting a preset volume according to background noise in a portable terminal according to certain embodiments of the present invention.

Referring to FIG. 3, in step 301, the portable terminal activates a microphone for receiving an input of background noise and then, proceeds to step 303 and receives an input of background noise through the microphone.

After that, the portable terminal proceeds to step 305 and estimates a background noise level using the currently input noise. At this time, the portable terminal checks if the input noise disturbs user's listening using the intensity of the background noise input through the microphone.

Next, the portable terminal proceeds to step 307 and loads control information. Here, the control information, which refers to information about a volume to be adjusted according to the background noise level, can allow the portable terminal to distinguish the noise level into a plurality of levels and adjust the volume differently every each level. At this time, that the volume is adjusted according to the noise level means that the volume is adjusted within a range not disturbing user's listening.

After that, the portable terminal proceeds to step 309 and compares the loaded control information with the predicted noise level and then, confirms volume information to be adjusted in order for the listening not to be disturbed by noise generated around the portable terminal. Then, the portable terminal proceeds to step 311 and processes to adjust the volume to the control information.

Next, the portable terminal terminates an algorithm according to certain embodiments of the present invention.

Figure 4:
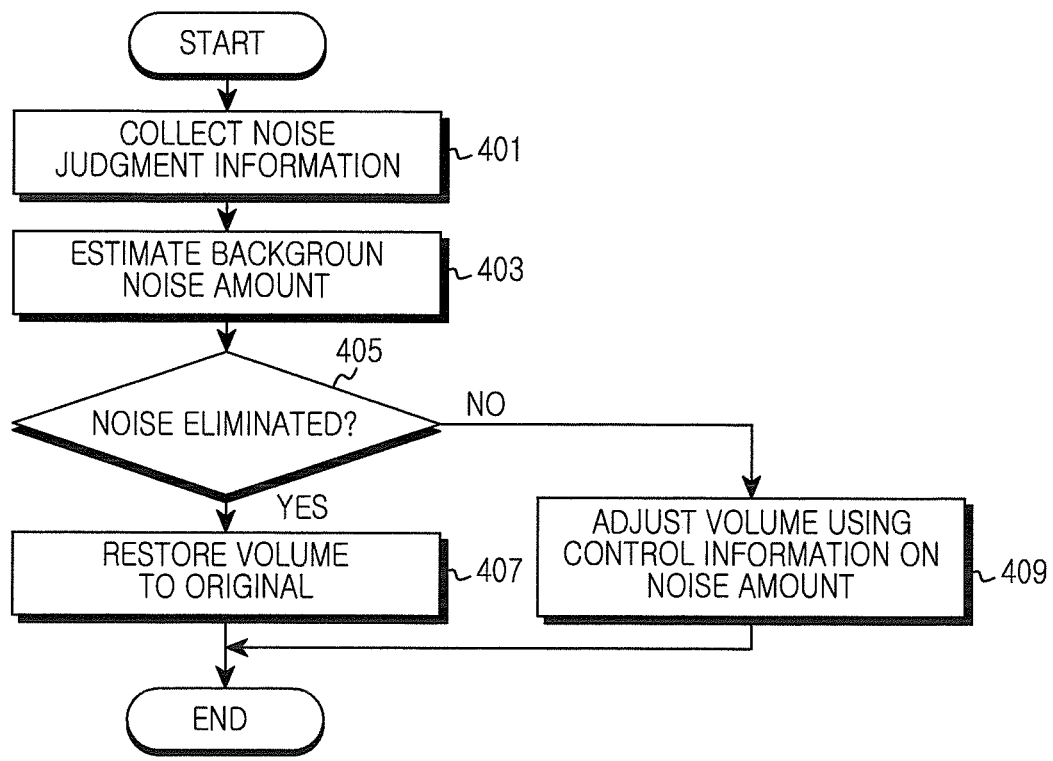
FIG. 4 illustrates an example process for adjusting a preset volume according to background noise in a portable terminal according to a further certain embodiments of the present invention.

FIG. 4 is a flowchart illustrating a process for adjusting a preset volume according to background noise in a portable terminal according to certain embodiments of the present invention.

Referring to FIG. 4, in step 401, the portable terminal collects noise judgment information that is used for judging the extent of background noise. Here, the background noise includes disturbing noise, a call sound, and the like outputted from the portable terminal, and the noise judgment information can be background noise input through a microphone, weather information acquired through a weather information server, a vehicle state, a vehicle model, and the like. This is because noise can be generated from a vehicle moving at high speed, rainy sound, etc. can disturb the listening, and noise can be generated according to the vehicle model.

At step 403, the portable terminal estimates a background noise level using the noise judgment information collected in step 401. Then at step 405, the portable terminal checks if it is in a noise eliminated state. Here, the noise-eliminated state refers to a situation in which no noise is generated or relatively low level of noise is generated.

If it is checked in step 405 that noise is not eliminated, the portable terminal adjusts the volume using control information on the noise level in step 409. That is, step 409 is similar to an operation of FIG. 2 or FIG. 3 described earlier.

In contrast, if it is checked in step 405 that the noise is eliminated, the portable terminal restores an adjusted volume to the original volume in step 407. Then, the portable terminal terminates an algorithm according to certain embodiments of the present invention.

Figure 5A:
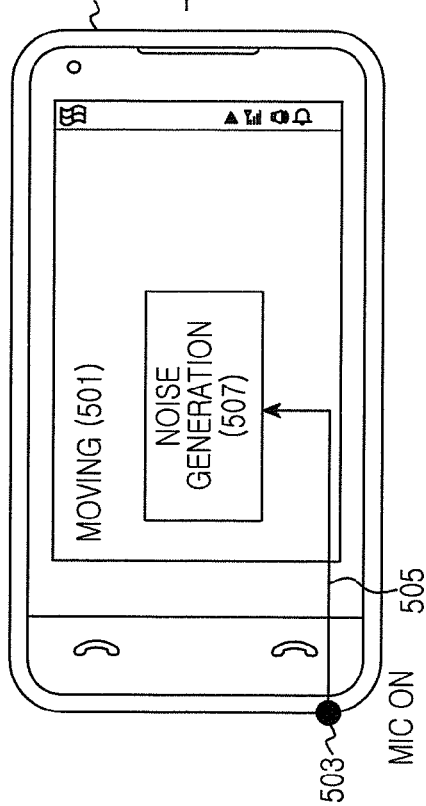
FIGS. 5A through 5C illustrate an example process for adjusting a preset volume according to background noise in a portable terminal according to certain embodiments of the present invention.
Figure 5B:
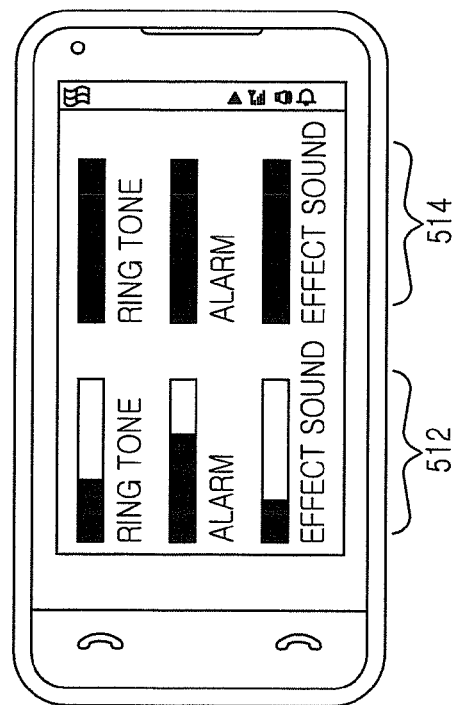
Figure 5C:
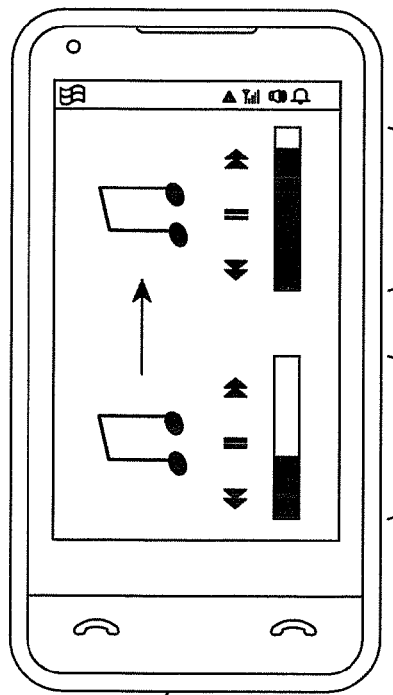

FIG. 5A through 5C illustrate an example process for adjusting a preset volume according to background noise in a portable terminal according to certain embodiments of the present invention.

Referring to FIG. 5A, the portable terminal 500 adjusts the volume using noise that is input through a microphone 503.

For example, when a portable terminal is located in a construction site having heavy background noise or a market crowded with people, the background noise or people's voice can make it difficult for a user to recognize an output sound of the portable terminal such as a call sound, a reception sound, an alarm, and the like.

In a conventional portable terminal, a user can manipulate a volume button of the portable terminal and increase the volume of the portable terminal to recognize an output sound in a noisy situation. Unlike this, a portable terminal according to certain embodiments of the present invention can estimate background noise and, based on the background noise, automatically increase the volume enough to recognize an output sound of the portable terminal.

The portable terminal 500 for performing the above operation activates the microphone 503 as illustrated in FIG. 5A and then, checks the generation or non-generation of background noise through the microphone 503.

At this time, when information disturbing listening is input (505) through the microphone 503, the portable terminal 500 judges that background noise has been generated (507).

If the portable terminal 500 judges that the background noise has been generated using the information input through the microphone 503, the portable terminal 500 increases the volume.

That is, the portable terminal 500 can increase the setting of all items whose volume adjustment is possible. For instance, as illustrated in FIG. 5B, a portable terminal 510 can simultaneously increase (512→514) the intensities of a call sound supported by a volume adjustment item, an alarm sound, an effect sound, a ring tone and the like.

Also, the portable terminal 500 can increase the volume for a function that is being currently executed. For instance, as illustrated in FIG. 5C, when playing a music file, a portable terminal 520 can increase (522→524) only the intensity of an output sound of a media player.

In FIGS. 5A through 5C, the portable terminal 500 checks the generation or non-generation of background noise through the microphone 503 and, at this time, because the portable terminal 500 activates the microphone 503, current consumption of the microphone 503 is induced.

By virtue of this, when detecting that the portable terminal 500 is moving (501), the portable terminal 500 can activate the microphone 503 and adjust the volume according to background noise. This is for considering a situation in which, while a user is moving, noise disturbing listening can be generated according to a movement speed or a movement means.

FIGS. 6A through 6C illustrate an example process for adjusting a preset volume according to background noise in a portable terminal according to certain embodiments of the present invention.

Referring to FIG. 6A, the portable terminal 600 adjusts the volume using weather information.

This is, because of a weather state such as rain, thunder, and lightning, a user cannot recognize an output sound of a portable terminal such as a call sound, a reception sound, an alarm and the like.

The portable terminal 600 for performing the above operation acquires weather information of a current location. At this time, as in FIG. 6A, the portable terminal 600 can confirm (604) weather information of a current area using an application (602) providing weather information.

If detecting that it is raining in a current area as illustrated, the portable terminal 600 judges that rainy sound is generated as noise that can disturb listening.

Accordingly, the portable terminal 600 can increase a preset volume of the portable terminal such that listening is not disturbed by the rainy sound.

That is, the portable terminal 600 can increase the setting of all items whose volume adjustment is possible. For instance, as illustrated in FIG. 6B, a portable terminal 610 can simultaneously increase (612→614) the intensities of a call sound supported by a volume adjustment item, an alarm sound, an effect sound, a ring tone and the like.

Also, the portable terminal 600 can increase the volume for a function that is being currently executed. For instance, as illustrated in FIG. 6C, when playing a music file, a portable terminal 620 can increase (622→624) only the intensity of an output sound of a media player.

By virtue of this, the listening shall not be disturbed by the rainy sound, although the user of the portable terminal 600 without performing separate manipulation process.

Figure 7B:
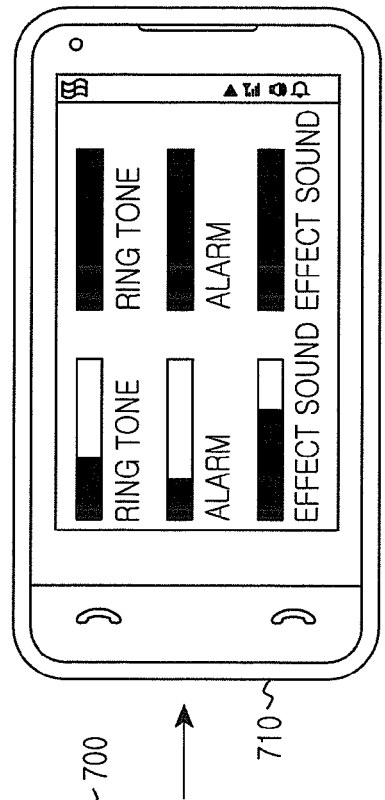
FIGS. 7A through 7C illustrate an example process for adjusting a preset volume according to background noise in a portable terminal according to certain embodiments of the present invention.
Figure 7C:
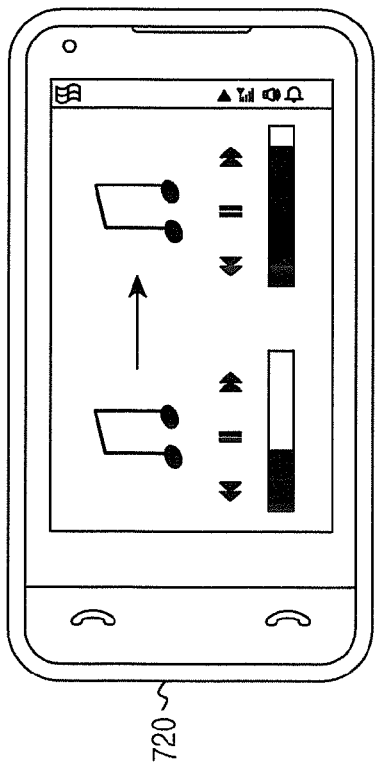
Figure 7A:

FIGS. 7A through 7C illustrate an example process for adjusting a preset volume according to background noise in a portable terminal according to certain embodiments of the present invention.

Referring to FIG. 7A, the portable terminal 700 processes to adjust the volume using a movement speed.

This is, in a situation in which a user walks fast or runs, the user cannot recognize an output sound of a portable terminal such as a call sound, a reception sound, an alarm, and the like.

When the user of the portable terminal runs or walks, background noise may not be generated. However, when the user runs or walks, a user' recognition capability for an output sound can be degraded and therefore, the problem that the user cannot recognize the output sound of the portable terminal can be solved by the certain embodiments of present invention.

Further, because background noise is generated while a user is moving using a public transportation, the user cannot recognize an output sound of a portable terminal such as a call sound, a reception sound, an alarm and the like.

The portable terminal 700 for performing the above operation detects a movement speed of the portable terminal 700. At this time, as in FIG. 7A, the portable terminal 700 can detect (704) the movement speed of the portable terminal 700 using GPS information (702) or detect the movement speed of the portable terminal 700 using information provided from a BS.

If confirming that the user currently moves in a vehicle at a speed of 80 kilometer (km) as illustrated, the portable terminal 700 judges that noise shall be generated due to high speed movement.

Accordingly, the portable terminal 700 can increase a preset volume of the portable terminal such that listening is not disturbed by the high-speed movement.

That is, the portable terminal 700 can increase the setting of all items whose volume adjustment is possible. For instance, as illustrated in FIG. 7B, a portable terminal 710 can simultaneously increase (712→714) the intensities of a call sound supported by a volume adjustment item, an alarm sound, an effect sound, a ring tone, and the like.

Also, the portable terminal 700 can increase the volume for a function that is being currently executed. For instance, as illustrated in FIG. 7C, when playing a music file, a portable terminal 720 can increase (722→724) only the intensity of an output sound of a media player.

By virtue of this, the listening shall not be disturbed by the noise generated due to the high-speed movement, although the user of the portable terminal 700 without performing a separate manipulation process.

FIG. 8 illustrates an example process for adjusting a preset volume according to background noise in a portable terminal according to certain embodiments of the present invention.

Referring to FIG. 8A, the portable terminal 800 controls the volume using a vehicle state.

The generated noise extent becomes different according to a vehicle model. As one example, noise can be greater in a diesel vehicle than a gasoline vehicle, and noise can be more generated in a passenger/freight vehicle than a passenger vehicle.

To detect a vehicle model as above, the portable terminal 800 confirms information of a vehicle that a user has got on.

At this time, as illustrated in FIG. 8A, the portable terminal 800 communicates with an electronic control unit 802 of the vehicle and receives information of the vehicle.

If confirming (804) that it is, for example, a year-old diesel passenger/freight car as illustrated, the portable terminal 800 judges that noise shall be generated inside the vehicle.

Accordingly, the portable terminal 800 can increase a volume of the portable terminal such that listening is not disturbed by the noise generated inside the vehicle.

That is, the portable terminal 800 can increase the setting of all items whose volume adjustment is possible. For instance, as illustrated in FIG. 8B, a portable terminal 810 can simultaneously increase (812→814) the intensities of a call sound supported by a volume adjustment item, an alarm sound, an effect sound, a ring tone, and the like.

Also, the portable terminal 800 can increase the volume for a function that is being currently executed. For instance, as illustrated in FIG. 8C, when playing a music file, a portable terminal 820 can increase (822→824) only the intensity of an output sound of a media player.

By virtue of this, the listening shall not be disturbed by the noise generated inside the vehicle, although the user of the portable terminal 800 without performing a separate manipulation process.

FIGS. 9A through 9C illustrate an example process for adjusting a preset volume according to background noise in a portable terminal according to certain embodiments of the present invention.

Referring to FIG. 9A, the portable terminal 900 adjusts the volume using a vehicle operation state.

This uses that a noise extent generated becomes different according to a function executed in a vehicle. As one example, when a vehicle wiper is activated, the portable terminal may detect more noise caused by the wiper operation.

Further, the portable terminal can detect noise generated inside or outside a vehicle according to a function executed in the vehicle. As one example, when a vehicle audio is activated, the portable terminal can judge that an output sound of the audio can act as noise of the vehicle inside and, when the vehicle wiper is activated, the portable terminal can judge that rainy sound can act as noise because it is currently raining.

To detect a function executed in a vehicle as above, the portable terminal 900 confirms information of the vehicle that a user has got on.

At this time, as shown in FIG. 9A, the portable terminal 900 can communicate with an electronic control unit 902 of the vehicle and receive information of the vehicle.

If confirming (904) that the wiper is being activated at maximum speed as illustrated, the portable terminal confirms weather information that it rains, and judges that noise caused by the wiper activation shall be generated.

Accordingly, the portable terminal 900 can increase a volume of the portable terminal 900 such that listening is not disturbed by the noise generated within the vehicle.

That is, the portable terminal 900 can increase the setting of all items whose volume adjustment is possible. For instance, as illustrated in FIG. 9B, a portable terminal 910 can simultaneously increase (912→914) the intensities of a call sound supported by a volume adjustment item, an alarm sound, an effect sound, a ring tone, and the like.

Also, the portable terminal 900 can increase the volume for a function that is being currently executed. For instance, as illustrated in FIG. 9C, when playing a music file, a portable terminal 920 can increase (922→924) only the intensity of an output sound of a media player.

By virtue of this, the listening shall not be disturbed by the noise generated inside the vehicle, although a user of the portable terminal 900 without performing a separate manipulation process.

Methods according to exemplary embodiments disclosed in claims and/or the specification of certain embodiments of the present invention can be implemented in hardware, software, or any combination thereof.

In case of implementing in software, a computer readable storage medium storing one or more programs (i.e., software modules) can be provided. One or more programs stored in the computer readable storage medium are configured to be executable by one or more processors within an electronic device such as a portable terminal. One or more programs include instructions for enabling the electronic device to execute the methods according to the exemplary embodiments disclosed in the claims and/or the specification of certain embodiments of the present invention.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a compact disk ROM (CD-ROM), a Digital Versatile Disk (DVD) or an optical storage device of other form, and a magnetic cassette. Or, they can be stored in a memory constructed in a combination of some or all of them. Also, each construction memory may be included in plural.

Further, the programs can be stored in a storage device attachable to an electronic device and accessible through a communication network such as the Internet, an intranet, a Local Area Network (LAN), a Wireless LAN (WLAN), or a Storage Area Network (SAN), or a communication network configured in a combination of them. This storage device can access the electronic device through an external port.

Furthermore, a separate storage device on a communication network may access a portable electronic device.

As one instance, a module of an electronic device, which includes one or more processors, a memory, and one or more modules stored in the memory and configured to be executed by the one or more processors, can collect noise judgment information that is information capable of being used for judging a background noise extent, estimate background noise using the collected information, and adjust the volume according to the estimated background noise.

Further, after adjusting the volume according to the background noise, if the background noise is eliminated, the module of the electronic device can restore the adjusted volume to the original volume.

Further, the module of the electronic device can load control information that is a definition of information about the volume to be adjusted according to a background noise level, confirm the volume suitable to the estimated noise information in the control information, and adjust the volume.

Further, the module of the electronic device can use, as noise judgment information, at least any one of background noise input through a microphone, weather information acquired through a weather information server, a vehicle state and model, and a movement speed.

Further, after adjusting the volume according to the background noise, when sensing a volume adjustment request, the module of the electronic device can perform adjustment to the volume corresponding to the user's request, and update control information to the volume corresponding to the user's request.

Further, the module of the electronic device can simultaneously adjust an item whose volume adjustment is possible according to background noise or adjust the volume for a function that is being currently executed.

As described above, certain embodiments of the present invention automatically adjusts the volume according to a background noise generation extent in order to receive a clear voice signal of a peer user in a portable terminal, thereby allowing a user to listen to output sound irrespective of background noise.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for adjusting volume in a portable terminal, the apparatus comprising:
   a memory configured to store control information, the control information including information about the adjustable volume;
   a controller, associated with the memory, the controller configured to:

collect information related to one or more of weather information, a vehicle state and model, and a movement speed;

estimate the background noise using the collected information;

determine control information related to the estimated background noise;

adjust the adjustable volume using the determined control information; and responsive to sensing a volume adjustment request, (i) adjust the adjusted volume to the volume related to the volume adjustment request, and (ii) update the control information by applying the volume related to the volume adjustment request.

2. The apparatus of claim 1, wherein, after adjusting the adjustable volume according to the background noise, the controller is configured to check if the background noise is eliminated and, if the background noise is eliminated, restore the adjusted volume to an original volume.

3. The apparatus of claim 1, wherein the controller is configured to collect, as the collected information, background noise received through a microphone.

4. The apparatus of claim 1, wherein the controller is configured to simultaneously adjust at least one of items whose volume adjustment is possible and the volume for a function that is being currently executed.

5. A method for adjusting volume in a portable terminal, the method comprising:
collecting noise judgment information that is used for judging the extent of background noise, wherein the noise judgment information comprises at least any one of weather information acquired through a weather information server, a vehicle state and model, and a movement speed;

estimating the background noise using the collected information;

determining control information corresponding to the estimated background noise; and adjusting the volume using the determined control information responsive to sensing a volume adjustment request, (i) adjusting the adjusted volume to the volume corresponding to the volume adjustment request, and (ii) updating the control information by applying the volume corresponding to the volume adjustment request.

6. The method of claim 5, wherein the method comprises:
after adjusting the volume using the determined control information, checking if the background noise is eliminated; and when the background noise is eliminated, restoring the adjusted volume to the original volume.

7. The method of claim 5, wherein the noise judgment information comprises background noise input through a microphone.

8. The method of claim 5, wherein adjusting the volume according to the background noise comprises at least any one of simultaneously adjusting items whose volume adjustment is possible, and adjusting the volume for a function that is being currently executed.

9. An electronic device comprising:
one or more processors;
a memory; and
one or more modules stored in the memory and configured to, when executed by the one or more processors:
collect information related to one or more of weather information, a vehicle state and model, and a movement speed, estimate the background noise using the collected information, determine control information corresponding to the estimated background noise, and adjust a volume of the electronic device using the determined control information, and responsive to sensing a volume adjustment request, (i) adjust the adjusted volume to the volume corresponding to the volume adjustment request, and (ii) update the control information by applying the volume corresponding to the volume adjustment request.

10. The device of claim 9, wherein, after adjusting the volume using the determined control information, if the background noise is eliminated, the module is configured to restore the adjusted volume to an original volume.

11. The device of claim 9, wherein the one or more modules are configured to use, as the noise judgment information, background noise input through a microphone.

12. The device of claim 9, wherein the one or more modules are configured to simultaneously adjust at least one of items whose volume adjustment is possible and the volume for a function that is being currently executed.

13. The device of claim 9, wherein the device comprises a mobile terminal.

* * * * *